Nov. 2, 1948.  E. A. SOMMER  2,452,963
SEED PLANTER
Filed Feb. 1, 1946  2 Sheets-Sheet 1
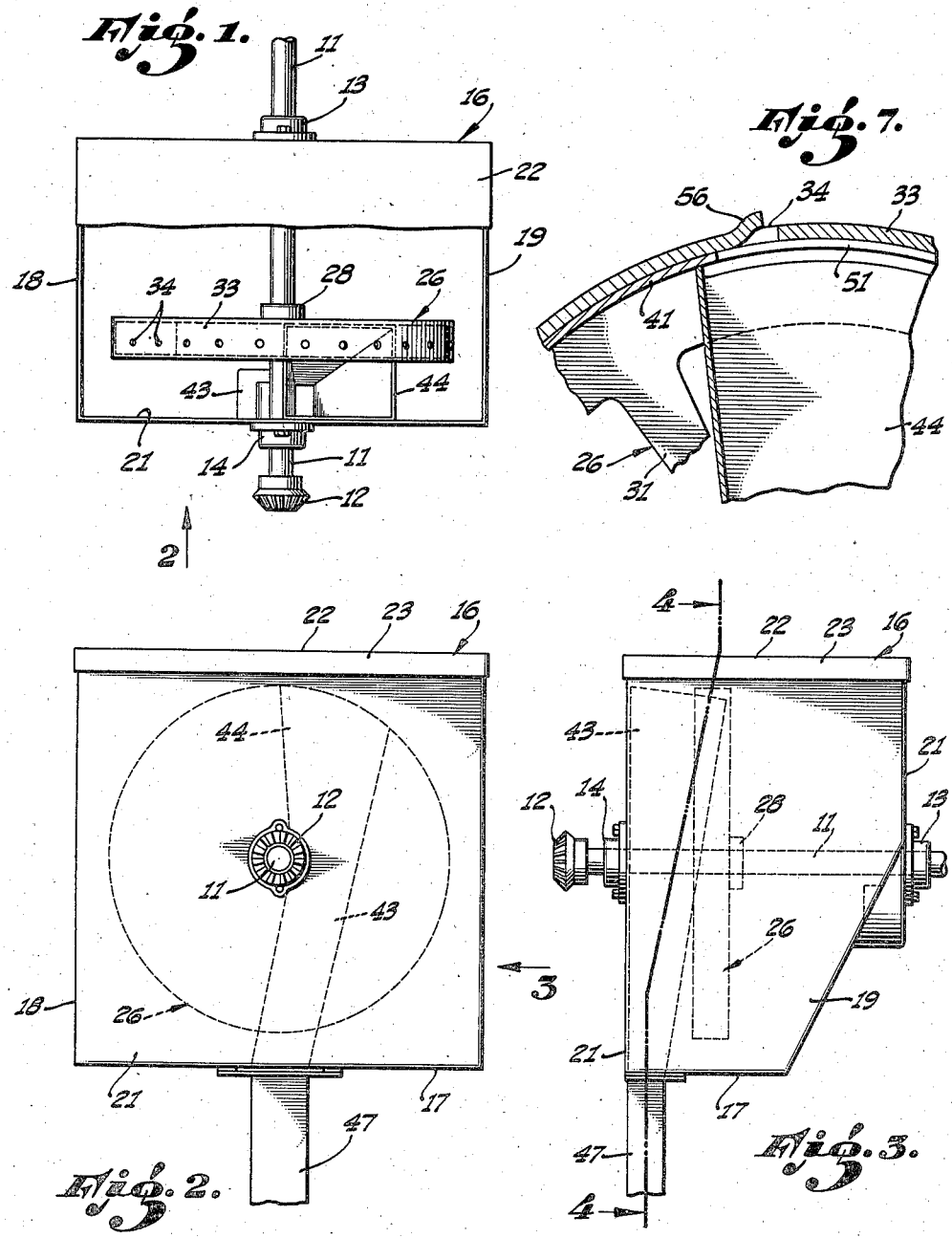
INVENTOR.
EMILE A. SOMMER,
BY
ATTORNEY.

Nov. 2, 1948.  E. A. SOMMER  2,452,963
SEED PLANTER
Filed Feb. 1, 1946  2 Sheets-Sheet 2
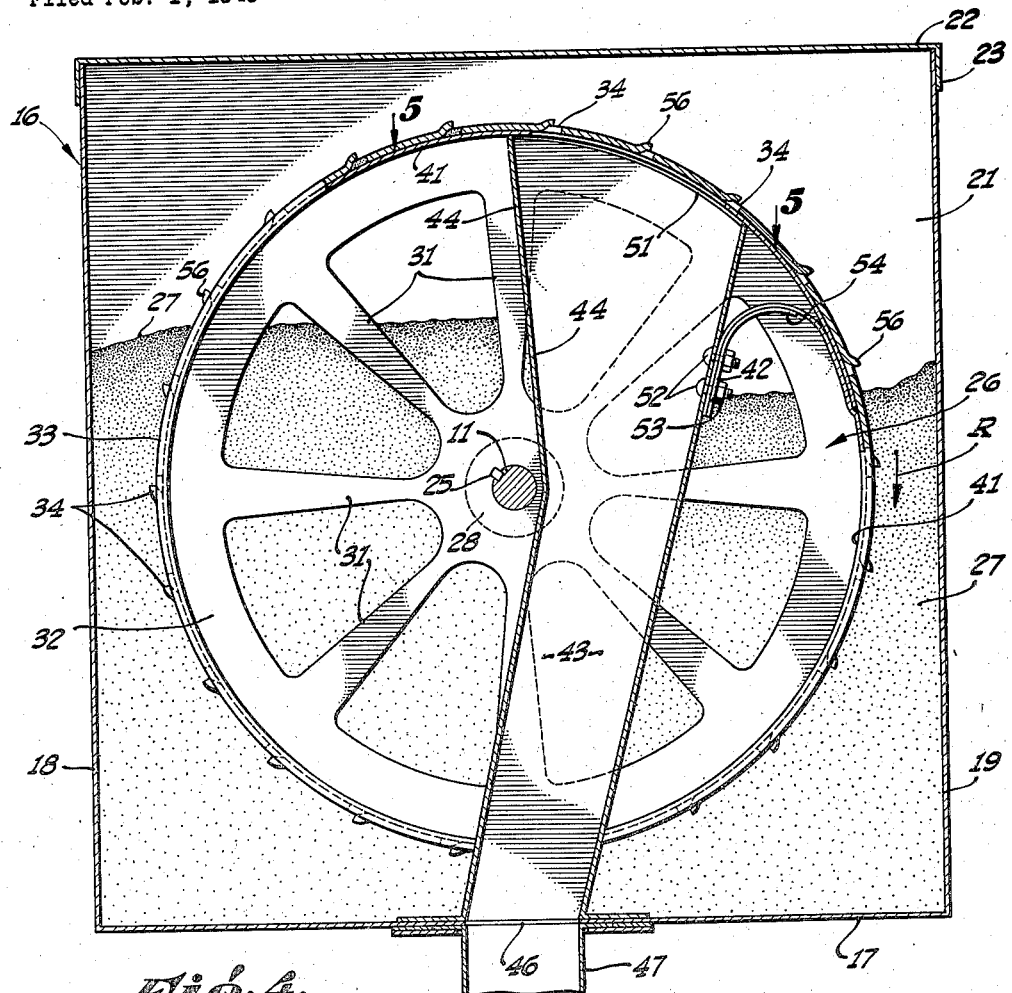
Fig. 4.
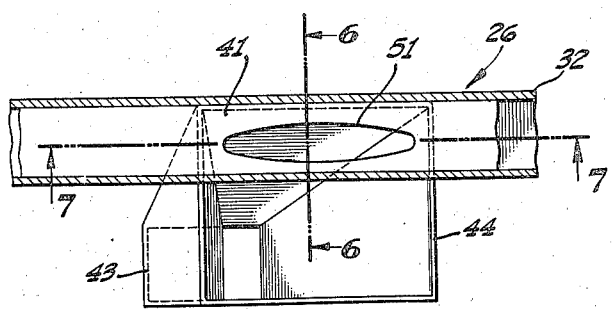
Fig. 5.
Fig. 6.
INVENTOR.
EMILE A. SOMMER,
BY
ATTORNEY.

Patented Nov. 2, 1948

2,452,963

UNITED STATES PATENT OFFICE 2,452,963

SEED PLANTER

Emile A. Sommer, North Hollywood, Calif.

Application February 1, 1946, Serial No. 644,697

3 Claims. (Cl. 222—367)

This invention relates to agricultural equipment and more particularly to seed-planting machines.

An object of my present invention is to provide a seed-planting machine which is possessed of the advantage that by its use an agriculturalist substantially eliminates the need of thinning plants after the seeds have sprouted and the young plants have attained substantial size, which need is one of the disadvantages inherent in the use of more conventional seed-planting equipment.

A more detailed object in this connection is to provide a seed-planting device which operates upon the principle of delivering a predetermined number of seeds at regular intervals as the device is advanced across the land, thereby causing one or more seeds to be planted at regularly spaced distances along a row instead of permitting a continuous stream of seeds to flow through an aperture of predetermined size as in the case of seed-planting machines now in common use.

A further object is to provide a seed-planting device of the general character indicated which, in spite of its being of very simple, inexpensive and rugged construction, is thoroughly dependable and highly efficient in planting substantially the exact number of seeds desired at the exact spacing most conducive to proper plant development.

The invention possesses other objects and features of advantage, some of which, with the foregoing, will be set forth in the following description of the preferred form of my invention which is illustrated in the drawing accompanying and forming part of the specification. It is to be understood that I do not limit myself to the showing made by the said drawing and description, as I may adopt variations of the preferred form within the scope of my invention as set forth in the claims.

Referring to the drawings:

Figure 1 is a top plan view of the seed-planting device of the present invention, a portion of the cover of the device being broken away the better to reveal the interior mechanism. The seed-planter is shown removed from the soil working tool in connection with which it is intended to be operated.

Figure 2 is a view in side elevation, the direction of view being indicated by the arrow 2 of Figure 1.

Figure 3 is a view in end elevation taken in direction of the arrow of Figure 2.

Figure 4 is an enlarged, longitudinal, compound sectional view, the planes of section being indicated by the lines 4—4 of Figure 3 and the direction of view by the arrows.

Figure 5 is a detail view which may be considered to be a sectional view taken along the arcuate plane indicated by the line 5—5 of Figure 4, the direction of view being indicated by the arrows.

Figure 6 is a transverse, vertical, sectional view, the plane of section being indicated by the line 6—6 of Figure 5 and the direction of view by the arrows.

Figure 7 is a more highly enlarged detail view taken in vertical section upon the line 7—7 of Figure 5 with the direction of view as indicated by the arrows.

A source of very considerable expense to the agriculturalist has been the use of conventional seed-planting equipment which operates upon the principle of permitting a small stream of seeds to flow continuously through an aperture of selected size in a plate which forms a portion of the bottom of a seed hopper as a soil working tool on which the hopper is mounted is advanced along the land. The hopper is usually mounted upon a piece of equipment provided with a leading plow or soil working tooth adapted to open a furrow into which fall the seed dropped from the hopper, and a second, reversely operating plow or soil working tool adapted to throw the soil back into the furrow and thus cover the seed. Use of a seed-planter of this type unavoidably results in the use of several times the quantity of seed actually required to start plants at the spacing which is required to produce plants of optimum characteristics. However, the cost of the seed being wasted is a small item as compared to the cost of the labor required to "thin out" the plants after they have sprouted and grown to substantial size, and thus leave the desired number of plants at the proper spacing.

The present invention contemplates dispensing with this source of needless expense to persons who plant seed in sufficient quantities to justify the use of mechanical seed-planting equipment, by making available seed-planting apparatus which plants seed in numbers substantially corresponding to the number of plants which should be allowed to grow to maturity in a given locality for optimum results, thereby effecting a very material saving in the cost of the seeds and a still greater saving by reducing or eliminating entirely the cost and inconvenience of thinning the excess plants.

With these general objects in view, the seed-planting apparatus of the present invention has been designed for use in conjunction with any suitable type of soil working tools which, inasmuch as its design has no particular relationship to the details of the present invention, need not be shown or described here. Suffice it to say that it includes preferably a frame mounted upon one or more wheels and having a furrow-opening soil working tool in advance of a second soil working tool which closes the furrow, sufficient space between the two soil working tools being left to permit mounting and operation of the seed-planting apparatus of the present invention to drop seeds in the furrow formed by the leading soil working tool and subsequently to be covered by the trailing soil working tool as the apparatus advances across the land. It should also be explained that such soil working apparatus is equipped with a shaft (also not shown) adapted to rotate by being connected to a wheel of the apparatus which turns as the tool advances.

The seed-planting apparatus of the present invention includes a transversely extending shaft 11 adapted to be operably connected to the said revoluble shaft of the supporting apparatus, as by a bevel gear 12, in such a manner that the shaft 11 rotates at a rate proportional to the speed at which the equipment is moved along the row to be planted. This shaft 11 is revolubly mounted in suitable journals 13 and 14 upon opposite sides of a hopper 16 which comprises a bottom 17, front and rear walls, 18 and 19 respectively, a pair of spaced side walls 21, and a removable top 22. A peripheral flange 23 extending downwards from the top 22 is adapted to engage the upper edges of the front, rear, and side walls, 18, 19, and 21, respectively, for the releasable retention of the top 22 in hopper-closing position. The journals 14 are disposed substantially at the centers of the two spaced side walls 21 with the result that the shaft 11 extends transversely through the hopper 16 or in position for the lower portion of a wheel 26 carried by the shaft 11 to be immersed within a supply of seeds 27 contained within the hopper 16. The wheel 26 is rigid with the shaft 11, being secured thereto as by a key 25 fitted within suitable grooves in the surface of the shaft 11 and the bore of the wheel's hub 28.

A plurality of radiating spokes 31 are interconnected at their outer ends by an annular flange 32; and extending laterally from the flange 32 is a cylindrical flange or rim 33 provided with pockets 34 at equally spaced intervals throughout its circumference, these pockets 34 being in the nature of holes extending radially with respect to the wheel 26 and completely through the rim 33. Moreover, each of the holes 34 is so proportioned that it is adapted to contain a predetermined number of the seeds to be planted. Accordingly, it is intended that a different wheel 26 will be used in connection with each size of seed to be planted; that is to say, each kind of seed will call for a particular design of wheel 26. Hence, it is desired that the means whereby the wheel 26 is rigidly secured to the shaft 11 be so designed that it is readily releasable, thus permitting withdrawal of the shaft 11 far enough to release the wheel 26 therefrom and permitting substitution for that wheel of another the size of whose seed-carrying pockets 34 is appropriate to the size of the seeds to be planted and the spacing of which pockets is appropriate to the desired distance between plants to mature from those seeds.

The inner ends of the holes 34 are closed throughout a substantial portion of their rotation about the axis of the shaft 11 by a resiliently flexible strip 41 which is flexed from its normal, straight form to arcuate or circular form so as to fit within the rim flange 33. The inherent resiliency of the material of which the strip 41 is composed therefore can be relied upon to urge the strip 41 outwards throughout its entire length and thus establish frictional engagement with the inner surface of the flange 33 and thereby effectually close the inner ends of the holes 34. The resilient strip 41 is anchored at one end 42 upon a suitable rigid support inside the wheel 26. A convenient support for the end 42 of the strip 41 is presented by a tubular chute 43 which is rigid with preferably one of the side walls 21 of the hopper 16 (see Figure 1). The upper end of the chute 43 is preferably enlarged to provide a funnel-shaped seed-receiving end 44 which is open at the top and which is disposed under and preferably closely adjacent that portion of the hole closing strip 41 which is at or near the uppermost portion of the wheel 26. The lower end of the chute 43 communicates with an opening 46 in preferably the bottom 17 of the hopper 16; and from the opening 46 a seed-carrying duct or chute 47 leads to a suitable point of discharge so that seeds falling into the open upper end 44 of the chute 43 will be delivered by gravity into the furrow formed by the leading soil working tool to which reference has been made hereinabove.

So as to permit emptying of each hole or pocket 34 as it comes into position above the open upper end of the chute 43, an aperture 51 is formed in that portion of the flexible strip 41 which is immediately above the funnel-shaped mouth 44. Inasmuch as the holes 34 are disposed substantially vertically when they move into registry with the aperture 51, the contents of each pocket 34 will fall through the strip 41 and into the chute 43 as that hole 34 moves into registry with the aperture 51.

The end 42 of the flexible strip 41 is secured to one wall of the chute 43 as by a plurality of fastening screws 52 and preferably the same screws retain a supporting brace 53, the upper end 54 of which is of arcuate form about a radius coinciding with the curvature through which the associated portion of the flexible strip 41 extends between the chute 43 and the proximal portion of the rim flange 33. This arcuate portion 54 therefore operates as a backing plate which prevents flexing the flexible strip 41 beyond its elastic limit, as might otherwise be the result of the frictional engagement between the outer surface of the strip 41 and the inner surface of the flange 33 as the wheel 26 turns. The direction of the wheel's rotation is indicated by the arrow R of Figure 4.

Preferably each of the holes 34 is formed with its trailing edge deflected outwards as best shown at 56 (see Figure 7), these parts being so shaped that the trailing edge 56 operates as a scoop as it passes through the supply of seeds 27 within the hopper 16, thereby assuring filling the associated hole 34 with the seeds and facilitating rotation of the seeds thus received within the hole 34 after that hole has passed out of the supply 27 and until the hole 34 reaches its position of registry with the aperture 51 in the strip 41.

*Operation*

It is believed that the manner of operation of the seed-planting device of the present invention is readily understandable from the hereinabove description of its construction. Due to the connection of the shaft 11 to one of the wheels of the soil working apparatus through the bevel gear 12, the wheel 26 will be rotated as the machine advances across the land and the rate of rotation of the wheel 26 will be appropriate to the rate of such advance. Accordingly, the holes or pockets 34 in the rim 33 of the wheel will be immersed successively in the supply 27 of seeds, causing each pocket 34 to receive one or more seeds, depending upon the size of the seeds being planted. The holes 34 thus supplied with one or more seeds will be elevated successively out of the supply 27 of seeds; and as they reach a position of registry with the aperture 51 in the strip 41, the contents of each hole will be permitted to drop into the chute 43 and will be conducted therefrom by the chute 47 to a point where they will drop into the furrow being formed by a soil working tool in advance of the discharge end of the chute 47. As hereinabove explained, the wheel 26 selected to do any particular job of planting will have its holes 34 so spaced that the machine carrying the apparatus will advance along the row the desired distance between plantings during the time that the wheel 26 rotates through an annular distance corresponding to the annular distance between adjacent holes 34. It is apparent therefore that regardless of the speed at which the machine is advanced along the row, one or more seeds will be dropped with the spacing between successive plantings in the row corresponding to the desired spacing of the matured plants.

I claim:

1. A seeder comprising a hopper adapted to contain a supply of seeds, a wheel revolubly mounted therein and comprising a rim partly immersed in said supply with the remainder of said rim extending thereabove, said rim having a plurality of circumferentially spaced holes therethrough, both lateral edges of said rim being uninterruptedly smooth throughout their entire extent and both the inner and outer peripheral faces of said rim being uninterruptedly smooth except for said holes whereby damaging of seeds within said hopper by rotation of said rim through said seeds is minimized, means for turning said wheel and thereby causing said holes successively to pass through said supply of seeds and then to be raised out of said supply, means pressing resiliently against one face of said rim and closing one end of each of said holes until that hole arrives at a predetermined position within said hopper and for thereupon opening said end of that hole to release that hole's contents, and seed-conveying means for receiving seeds from said holes as said ends thereof are opened.

2. A seeder comprising a hopper adapted to contain a supply of seeds, a wheel revolubly mounted therein and comprising a rim partly immersed in said supply with the remainder of said rim extending thereabove, said rim having a plurality of circumferentially spaced holes therethrough, both lateral edges of said rim being uninterruptedly smooth throughout their entire extent and both the inner and outer peripheral faces of said rim being uninterruptedly smooth except for said holes whereby damaging of seeds within said hopper by rotation of said rim through said seeds is minimized, means for turning said wheel and thereby causing said holes successively to pass through said supply of seeds and then to be raised out of said supply, flexible means providing a lining for and pressing resiliently outwards against the inner face of said rim and closing the inner end of each of said holes during at least a portion of the time that that hole is immersed in said supply of seeds and until that hole arrives at a predetermined position removed from said supply, and means for receiving seeds from said holes as they arrive at said predetermined position.

3. A seeder comprising a hopper adapted to contain a supply of seeds, a wheel revolubly mounted therein and comprising a rim partly immersed in said supply with the remainder of said rim extending thereabove, said rim having a plurality of circumferentially spaced holes therethrough, means for turning said wheel and thereby causing said holes successively to pass through said supply of seeds and then to be raised out of said supply, a strip of resiliently flexible material flexed to fit inside said rim and pressing outwardly thereagainst in frictional engagement therewith, anchoring means holding an end of said strip stationary with respect to said hopper and thereby enabling said wheel to rotate with respect to said strip, said strip having an opening therein in a portion thereof above said supply of seeds and in position for said holes to move successively into register therewith as said wheel turns, and seed receiving and conveying means disposed below said opening in position to receive seeds as they fall therethrough.

EMILE A. SOMMER.

REFERENCES CITED

The following references are of record in the file of this patent:

UNITED STATES PATENTS

| Number | Name | Date |
|---|---|---|
| 1,377,766 | Englund | May 10, 1921 |
| 1,394,097 | Lachapelle | Oct. 18, 1921 |
| 2,111,485 | Boykin | Mar. 15, 1938 |
| 2,174,120 | Cobbley et al. | Sept. 26, 1939 |

FOREIGN PATENTS

| Number | Country | Date |
|---|---|---|
| 61,035 | Norway | June 26, 1939 |